US009950335B2

(12) United States Patent
Roeckle et al.

(10) Patent No.: US 9,950,335 B2
(45) Date of Patent: Apr. 24, 2018

(54) DEVICE FOR SEPARATING OVERSPRAY

(71) Applicant: EISENMANN AG, Böblingen (DE)

(72) Inventors: Juergen Roeckle, Magstadt (DE); Daniel Sluka, Stuttgart (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/765,880

(22) PCT Filed: Jan. 16, 2014

(86) PCT No.: PCT/EP2014/000106
§ 371 (c)(1),
(2) Date: Aug. 5, 2015

(87) PCT Pub. No.: WO2014/121888
PCT Pub. Date: Aug. 14, 2014

(65) Prior Publication Data
US 2015/0367372 A1 Dec. 24, 2015

(30) Foreign Application Priority Data

Feb. 5, 2013 (DE) .................. 10 2013 001 982

(51) Int. Cl.
B05B 15/12 (2006.01)
F23G 5/033 (2006.01)
(Continued)

(52) U.S. Cl.
CPC ...... B05B 15/1248 (2013.01); B01D 46/0002 (2013.01); B01D 46/42 (2013.01); Y02P 70/36 (2015.11)

(58) Field of Classification Search
CPC ..... B05B 15/12; B05B 15/1248; F23G 5/033; F23G 5/04; B01D 46/42; B01D 45/12;
(Continued)

(56) References Cited

U.S. PATENT DOCUMENTS 3,926,103 A 12/1975 Smith
4,545,324 A 10/1985 Browning
(Continued)

FOREIGN PATENT DOCUMENTS

CN 202655183 U 1/2013
DE 27 31 123 1/1979
(Continued)

Primary Examiner — Frank Lawrence, Jr.
Assistant Examiner — Minh-Chau Pham
(74) Attorney, Agent, or Firm — Schroeder Intellectual Property Law Group, LLC

(57) ABSTRACT

The invention relates to a device for separating overspray from the booth air of coating booths, in particular painting systems, charged with overspray. The device includes a separation unit through which booth air charged with overspray can be guided and in which overspray is separated. The separating unit is designed as an exchangeable structural unit having a filter housing, an inlet opening and a filter unit. The air flow charged with overspray can be guided via the air guiding device to the separation unit. The separating unit includes an inlet collar which defines the inlet at least in sections and the air guiding device includes a connecting sleeve, which immerses in such a manner into the inlet opening when the separating device is in operation in such a manner that said connecting sleeve is surrounded by the inlet collar of the separation unit.

26 Claims, 9 Drawing Sheets

(51) Int. Cl.
*F23G 5/04* (2006.01)
*B01D 46/42* (2006.01)
*B01D 45/12* (2006.01)
*B01D 46/00* (2006.01)

(58) Field of Classification Search
CPC .............. B01D 46/0013; B01D 50/002; B01D 46/0023
USPC ................. 55/385.2, DIG. 46, 342, DIG. 18; 118/50, 326, DIG. 5; 454/50
See application file for complete search history.

(56) References Cited

U.S. PATENT DOCUMENTS

| | | | |
|---|---|---|---|
| 5,205,869 A | 4/1993 | Ahern | |
| 6,471,737 B2* | 10/2002 | Cole | B01D 50/002 118/326 |
| 6,723,169 B2 | 4/2004 | Hihn et al. | |
| 8,535,420 B2* | 9/2013 | Holler | B01D 46/0002 118/309 |
| 2003/0217691 A1 | 11/2003 | Hihn et al. | |
| 2014/0202332 A1 | 7/2014 | Link et al. | |
| 2015/0135955 A1 | 5/2015 | Link et al. | |
| 2015/0375251 A1* | 12/2015 | Roeckle | B05B 15/1248 454/53 |
| 2016/0023231 A1* | 1/2016 | Schmeinck | B05B 15/1248 95/273 |
| 2016/0288036 A1* | 10/2016 | Wieland | B05B 15/1248 |

FOREIGN PATENT DOCUMENTS

| | | |
|---|---|---|
| DE | 102 09 499 A1 | 10/2003 |
| DE | 20 2005 013 403 U1 | 8/2005 |
| DE | 10 2007 041 008 A1 | 3/2009 |
| DE | 10 2011 108 631 A1 | 1/2013 |
| EP | 1 342 507 A1 | 2/2003 |
| JP | 2005-40682 A | 2/2005 |
| JP | 2010-274204 A | 12/2010 |
| JP | 2012-232254 A | 11/2012 |
| WO | 2013/131611 A1 | 9/2013 |

* cited by examiner

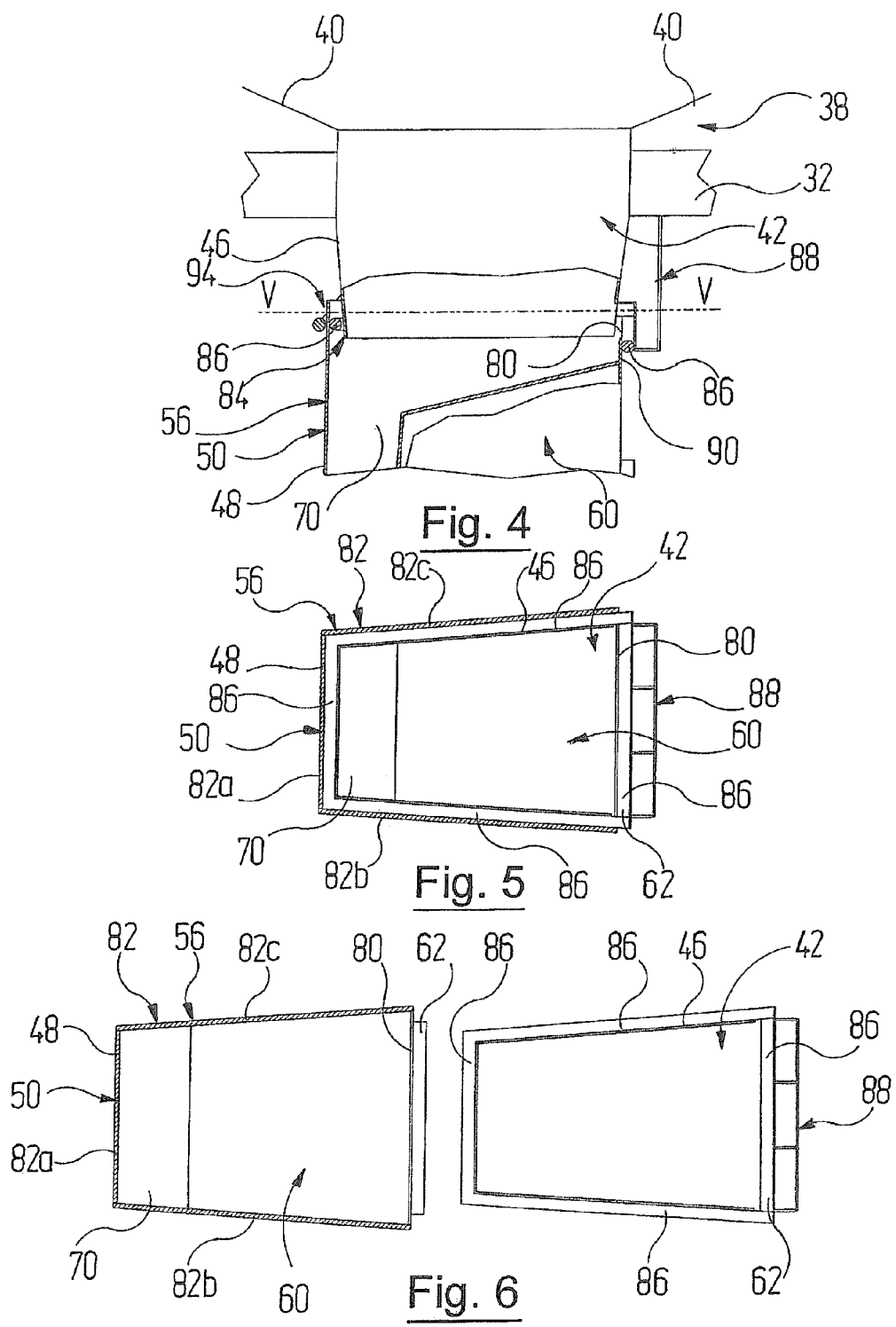

DEVICE FOR SEPARATING OVERSPRAY

RELATED APPLICATIONS

This application is a national phase of International Patent Application No. PCT/EP2014/000106, filed Jan. 16, 2014, which claims the filing benefit of German Patent Application No. 10 2013 001 982.6, filed Feb. 5, 2013, the contents of both of which are incorporated herein by reference.

FIELD OF THE INVENTION

The invention relates to a device for separating overspray from the overspray-laden booth air of coating systems, in particular painting systems, having
a) a separation unit through which overspray-laden booth air can be conducted and in which overspray is separated; wherein
b) the separation unit is constructed as an exchangeable structural unit with a filter housing, an inlet opening and a filter unit;
c) the overspray-laden air flow can be conducted via an air conducting device to the separation unit.

BACKGROUND OF THE INVENTION

When paints are applied manually or automatically to objects, a substream of the paint, which generally contains both solid bodies and/or binding agents as well as solvents, is not applied is to the object. This substream is known among experts as "overspray". In the broader sense, the terms overspray, overspray particles or overspray solids are always referred to within the context of a disperse system, such as an emulsion or suspension or combination thereof. The overspray is taken up by the air flow in the paint booth and supplied for separation so that, if required, the air can be conveyed back to the coating booth after suitable conditioning.

Particularly in systems with a relatively high paint consumption, for example in systems for painting vehicle bodies, wet separation systems on the one hand or electrostatically operating dry separators on the other are preferably used in known manner. In known wet separators, a relatively high amount of energy is needed to circulate the very large quantities of water required. Treating the rinsing water is costly due to the elevated use of paint-binding and detackifying chemicals and the disposal of paint sludge. Furthermore, owing to the intensive contact with the rinsing water, the air absorbs a high amount of moisture which, in recirculating-air mode, in turn results in a high energy consumption for treating the air. In electrostatically operating dry separators, the paint overspray has to be continuously removed from the separation surfaces, which generally involves very complex structural measures and can therefore be susceptible to faults. Moreover, the energy consumption in such separators is relatively high.

As an alternative to these separation systems, devices of the type mentioned at the outset are known, which operate using exchangeable filter modules which can be exchanged for unladen filter modules and disposed of or possibly recycled after an overspray loading limit is reached. In terms of the energy used and the resources required, the treatment and/or disposal of such filter modules can be more acceptable than the expense linked to a wet separator or an electrostatically operating separation device.

In known separation devices of this type, such as those described for example in DE 20 2005 013 403 U1, the separation units are frequently arranged next to one another and form a type of filter wall which is acted upon by the overspray-laden booth air. Suitable separation units are described for example in AT 411 331 B. Before the booth air arrives at the inlet of a separation unit, however, it flows over the outer housing regions of the separation unit at which overspray is already separated. Over the course of time, this causes the mutually adjacently arranged separation units to stick to one another which in turn makes it difficult for them to be exchanged, and in particular to be exchanged in a desirable automated operation.

SUMMARY OF THE INVENTION

An object of the invention, therefore, is to provide a device of the type mentioned at the outset which takes these considerations into account.

This object may be achieved in a device of the type mentioned at the outset in that
d) the separation unit has an inlet collar which delimits the inlet opening at least in part;
e) the air conducting device comprises a connecting piece which, in an operating position of the separation unit, dips into the inlet opening thereof in such a way that the connecting piece is surrounded by the inlet collar of the separation unit.

As a result of the connecting piece of the air conducting device, which therefore dips into the inlet opening of the separation unit, overspray-laden booth air only comes into contact with components of the separation unit when it is inside the separation unit. There is no risk, or only a slight risk, that overspray can deposit on outer surfaces of the separation unit and bond a plurality of separation units together.

Favourable flow guidance can be achieved if the inlet opening is arranged at the top in the operating position of the separation unit. Particularly in the case of paint booths, the air can therefore be guided into the separation unit on a linear path from top to bottom. Conversely, with curved flow paths, the inertia of the overspray particles results in these separating on wall regions in curved areas. This effect is minimised with a linear flow path.

With regard to a fully or at least semi automatic exchange of a separation unit, it is advantageous if the inlet collar has a deeper portion so that a collar portion of the inlet collar is formed which projects with respect to the deeper portion. In this case, the separation unit can be moved with a horizontal movement over the outlet connection of the conducting device, or away from this, without the separation unit having to be raised or lowered.

The collar portion preferably comprises three limbs and surrounds the inlet opening trapezoidally, with the outlet connection of the air conducting device being complementary thereto. In particular, the collar portion tapers on the side opposite the deeper portion. A substantially flow-tight connection can therefore be established when the inlet collar moves over the outlet connection of the air conducting device.

It is alternatively preferred when the inlet collar is constructed as a bearing frame which is inclined with respect to a horizontal plane in the operating position of the separation unit, thereby forming the deeper portion at the lowest point of the bearing frame, with the outlet connection of the air conducting device being complementary thereto.

It is particularly favourable if sealing means are present, by means of which the connecting piece of the air conducting device can be sealed in flow-tight manner with respect to the inlet opening of the filter module.

A simple design of the separation units can be achieved if the filter housing of the separation unit is constructed as a housing frame which surrounds the filter unit.

It is advantageous here if the air conducting device comprises a plurality of connecting pieces for a plurality of separation units which are formed by an outlet floor of the air conducting device.

It is then particularly favourable if the plurality of connecting pieces are arranged in a 2-dimensional matrix. This enables the use of a planar filter wall with a good filter effect.

Again with a view to an exchange procedure which is as automated as possible, a conveyor system is advantageous by means of which a separation unit can be conveyed to a connecting piece of the air conducting device, brought into its operating position, disconnected from the connecting piece again and transported away from the connecting piece.

In this arrangement, the conveyor system can comprise at least one belt conveyor which can be in particular raised or lowered when it is not possible to couple the separation unit to the connecting piece of the conducting device merely by means of a horizontal movement.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show:

FIG. 4 a partial section on an enlarged scale, which shows the connection of the filter module of the first type according to FIG. 3 to a connecting piece of the air conducting device;

FIG. 5 a section of the view of FIG. 4 along the section line V-V therein;

FIG. 6 a section corresponding to FIG. 5, in which the filter module is separate from the air conducting device, as shown in FIG. 2;

DETAILED DESCRIPTION OF THE PRESENT INVENTION

Figure 1:
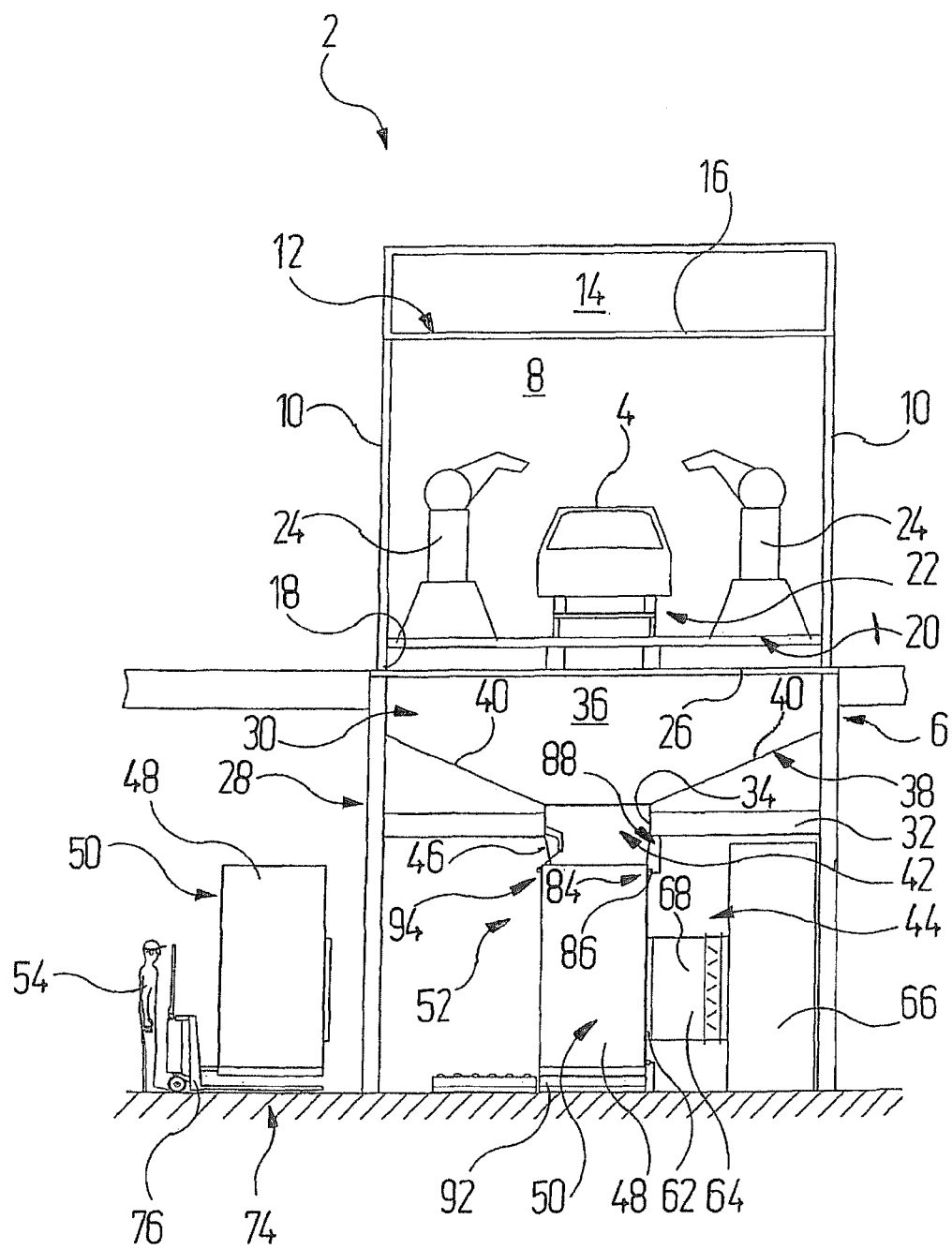
FIG. 1 a paint booth with a separation device for overspray according to a first exemplary embodiment in a front view, in which booth air is conducted via an air conducting device to filter modules of a first type.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is firstly made to FIGS. 1 to 6. In FIG. 1, 2 denotes a paint booth, as a whole, of a surface treatment system in which vehicle bodies 4 are painted after they have been for example cleaned and degreased in pre-treatment stations (not shown specifically) which are positioned upstream of the paint booth 2. The paint booth 2 rests on a steel structure 6 as is known per se.

The paint booth 2 comprises a paint tunnel 8 which is arranged at the top and is delimited by vertical side walls 10 and a horizontal booth ceiling 12, but is open at the end faces. The paint tunnel 8 is moreover open at the bottom in such a way that overspray-laden booth air can flow downwards out of the paint tunnel 8. The booth ceiling 12 is constructed in conventional manner as a lower delimitation of an air supply chamber 14 with a filter cover 16.

Arranged above a lower opening 18 of the paint tunnel 8 is a steel frame 20 which supports conveyor technology 22 which is known per se and is not referred to in more detail here. This enables vehicle bodies 4 which are to be painted to be transported from the entry side of the paint tunnel 8 to its exit side. Located inside the paint tunnel 8 are application devices in the form of multi-axis application robots 24, as are known per se. The vehicle bodies 4 can be coated with paint by means of the application robots 24.

The lower opening 18 of the paint tunnel 8 is covered by an accessible grate 26. Located below the grate 26 is a system region 28 in which the overspray particles entrained by the booth air are separated from the booth air.

Therefore, air flows out of the air supply chamber 14 downwards through the paint tunnel 8 to the system region 28, during which the air in the paint tunnel 8 takes up and entrains paint overspray which is present in the paint tunnel 8.

The system region 28 comprises a flow region 30 into which the overspray-laden booth air firstly flows and which is open to the paint booth 2 at the top for this purpose, but is delimited to the side by the side walls 10 and to the bottom by an intermediate ceiling 32. The intermediate ceiling 32 has a plurality of successively arranged passages 34 in the longitudinal booth direction, of which only one is shown in FIG. 1 owing to the sectional view.

In the flow region 30, the booth air firstly arrives in a conduit 36 of an air conducting device 38 which is formed by guide plates 40 which extend from the side walls 10 at a downward angle to the passages 34 in the intermediate wall 32. The conduit 36 leads down into a plurality of connecting channels 42 of which one extends in each case through a respective passage 34 in the intermediate wall 32 and downwards into a separation region 44 of the system region 28 and terminates there in a connecting piece 46.

In the separation region 44, the connecting channels 42 are each fluidically coupled to a filter module 48, with the booth air in the present exemplary embodiment flowing into the filter modules 48 in an altogether vertical flow direction.

Each filter module 48 forms one of a plurality of separation units 50 which are used in the operation of a separation device (denoted as a whole by 52) arranged in the separation region 44 of the paint booth 2. The separation device 52 in the present exemplary embodiment is therefore a separation filter which is composed modularly of the separation units 50 and the filter modules 48. Each filter module 48 can be constructed in a manner known per se as a separation filter or as an inertial filter or even as a combination thereof.

The exemplary embodiment according to FIGS. 1 to 6 uses separation units 50 of a first type in the form of the container-like filter modules 48, which have a relatively large volume as illustrated by a comparison of a filter module 48 and an operator 54 shown by way of example in FIG. 1.

In operation, each filter module 48 is releasably connected to one of the connecting channels 42 of the air conducting device 38. Each filter module 48 has a filter housing 56 with an inlet opening 58 to which the connecting piece 46 of the air conducting device 38 is complementary. In particular, the connecting piece 46 of the air conducting device 38 dips at least partly into the inlet opening 58 when the filter module 48 assumes an operating position in which its inlet opening 58 is connected to the connecting piece 46 of the air conducting device 38.

The filter modules 48 are then fluidically connected to the air conducting device 38 in such a way that no overspray-laden booth air can reach the outer surfaces of the filter modules 48. There is therefore no risk, or only a slight risk, of the filter modules 48 becoming stuck together on the outside by depositing overspray. This applies, generally speaking, to separation units 50 which are constructed accordingly.

The booth air is deflected once again through 90° in the filter module 48, flows thereby through a filter unit 60, (only shown in FIG. 3) on which the paint overspray separates, and exits the filter module 48 through the filter outlet connection 62.

All in all, each separation unit 50 is constructed as an exchangeable structural unit with a filter housing 56, an inlet opening 58 and a filter unit 60.

The booth air, which is now substantially free of overspray particles, flows out of the filter outlet connection 62 into an intermediate channel 64 through which it arrives in a collecting flow channel 66. The intermediate channel 64 has an inlet flange 68, it being possible for the filter outlet connection 62 of the filter module 48 to be fluidically connected, or disconnected from, this inlet flange 68 as a result of its horizontal movement described above. A filter module 48 is therefore ready in its operating position when its filter outlet connection 62 is moreover connected to the inlet flange 68 of the intermediate channel 64.

The booth air is supplied via the collecting flow channel 66 for further treatment and conditioning and then conducted in a circuit (not shown specifically here) back into the air supply chamber 14 from which it flows back into the paint tunnel 8 from above. For the event that the booth air has not been sufficiently freed of overspray particles by the filter module 48, it is possible to arrange, downstream of the filter module 48, further filter stages to which the booth air is supplied and in which, for example, fleece filters or even electrostatically operating separation filters are used, as are known per se. It is also optionally possible to integrate one or more further filter stages of this type in the filter module 48. It is therefore, for example, possible to arrange a filter fleece upstream of the filter outlet connection 62.

One of the filter modules 48 is now explained in more detail with reference to FIG. 3. As can be seen therein, the filter housing 56 of the filter module 48 delimits a flow chamber 70 which extends between the inlet opening 62 and the filter outlet connection 54 and through which booth air flows on a flow path which is curved through 90°.

The filter housing 56 in turn comprises a base part 72 which, in the present exemplary embodiment, is constructed as a standardised supporting structure in terms of its geometry and dimensions, and for example according to the specifications of a so-called Euro pallet. It is thus possible for a filter module 48 to be moved using a conveyor system 74 adapted to standard structures of this type and brought into, or removed from, its operating position. This is indicated in FIG. 1 using the example of an elevating conveyor 76 which can be operated manually by the operator 54.

The arrangement of the filter modules 48 in the separation region 44 of the paint booth 2 can be effected accordingly in the manner of a grid which rests on the standardised base part 72 used.

At least a lower collecting region of the filter module 48 is fluid-tight and thus constructed as a collecting trough 78 for paint which is separated in the filter module 48 and flows off downwards.

Figure 3:
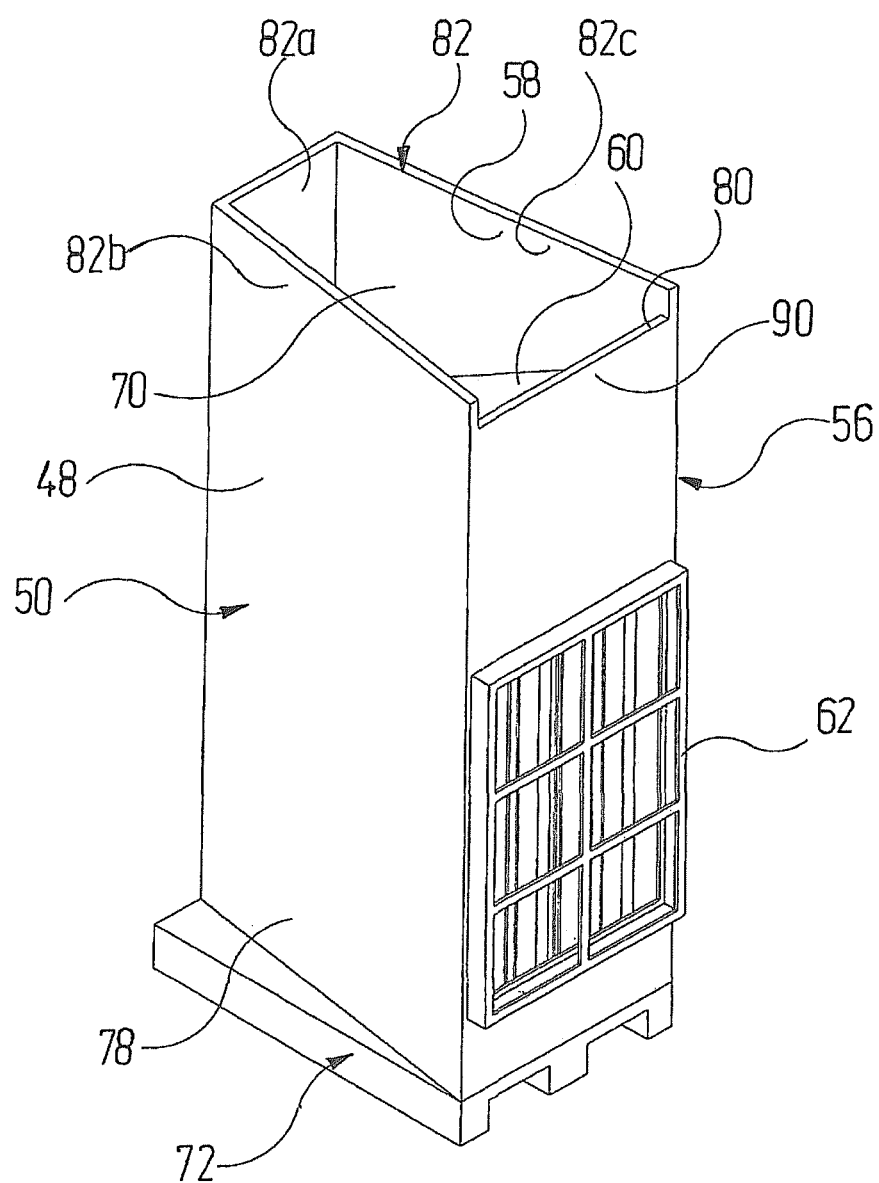
FIG. 3 a perspective view of a filter module of the first type of separation device.
Figure 7:
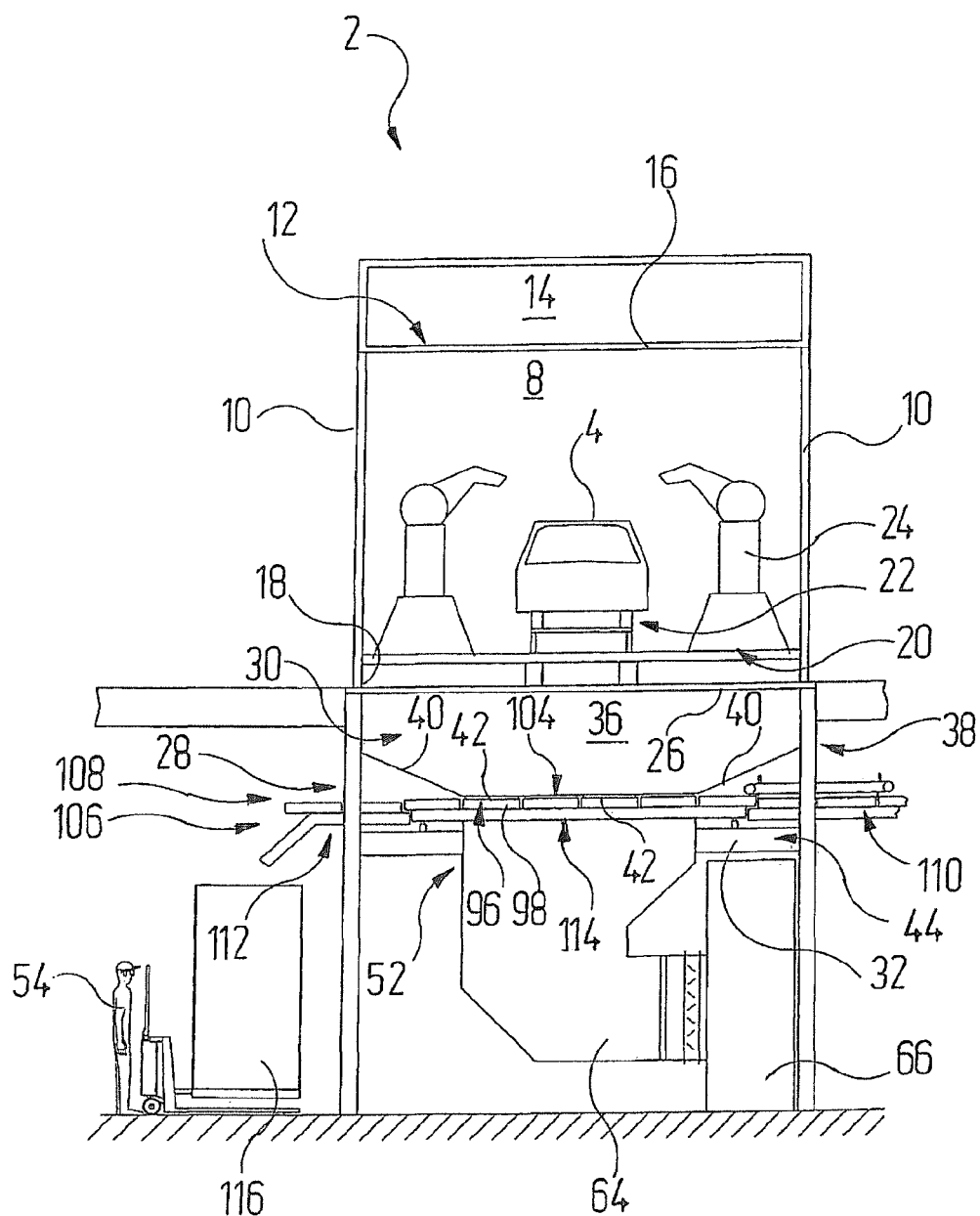
FIG. 7 the paint booth with a separation device for overspray according to a second exemplary embodiment in a front view, in which booth air is conducted via an air conducting device to filter modules of a second type.
Figure 8:
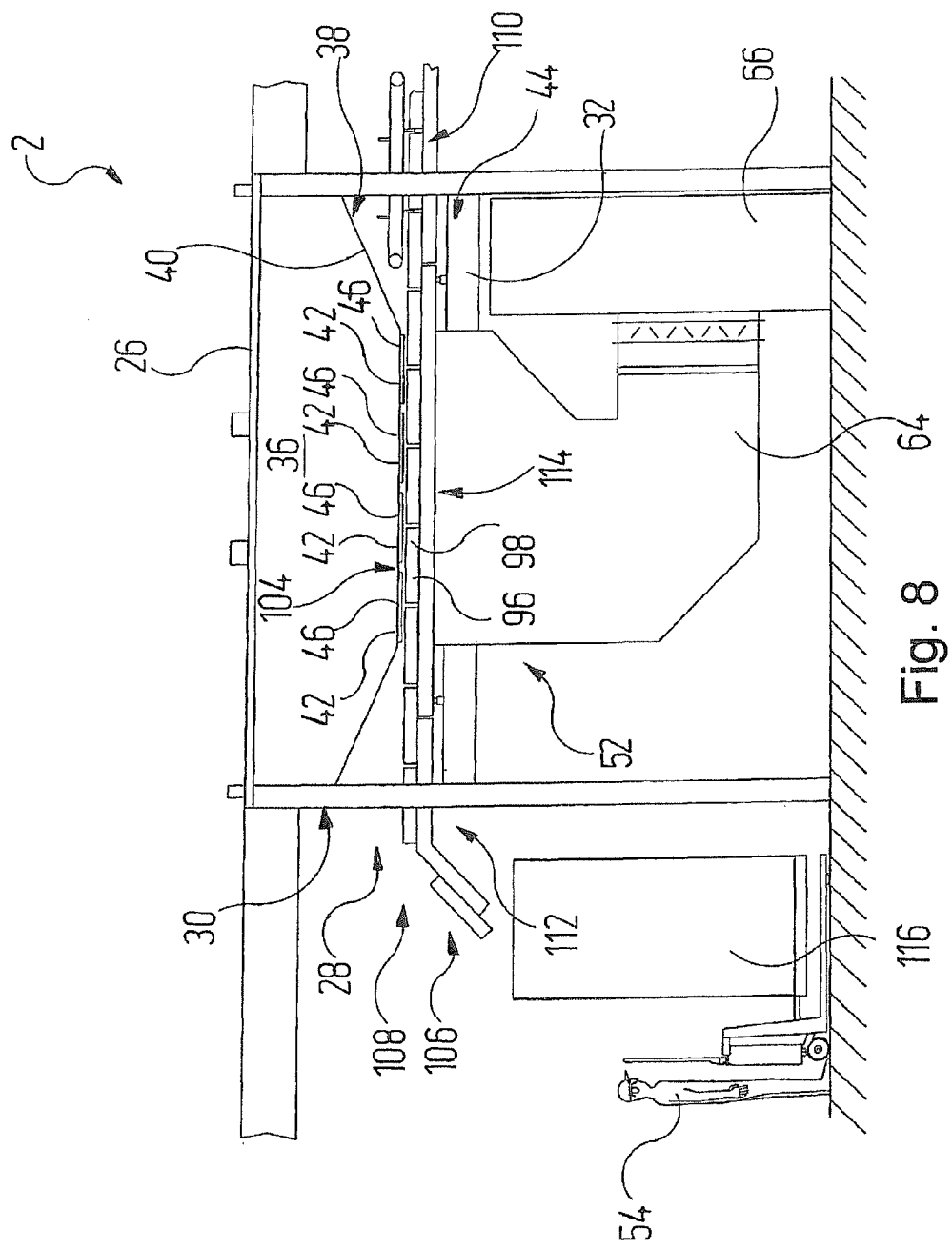
FIG. 8 the separation region of the paint booth in a front view, with the k filter modules of the second type located in an exchange phase.
Figure 9:
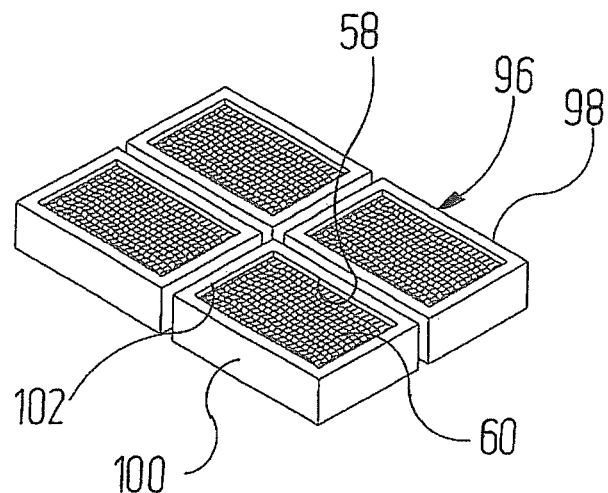
FIG. 9 a perspective view of a plurality of filter modules of the second type.
Figure 10:
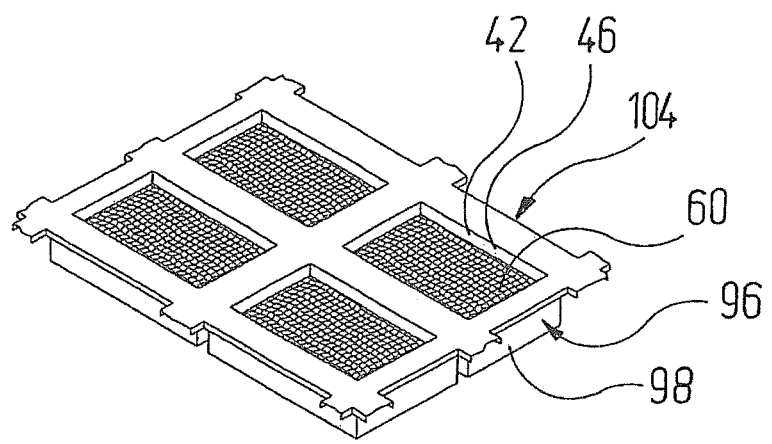
FIG. 10 the perspective view of FIG. 9, in which a connecting floor of the air conducting device is also shown.

As can be seen in FIG. 3, a deeper passage portion 80 is present on an inlet collar 82 on the filter housing 56 of the filter module 48. As a result of the deeper passage portion 80, a collar portion is formed which projects with respect to the deeper passage portion 80. In the present exemplary embodiment, this collar portion is formed by a bearing limb 82*a*, which is opposite the deeper passage portion 80, and two collar limbs 82*b* and 82*c*. In this arrangement, the collar limbs 82*b* and 82*c* diverge in the horizontal plane in the direction of the deeper passage portion 80. All in all, the inlet opening 58 is therefore trapezoidal in cross-section. The collar portion with the limbs 82*a*, 82*b* and 82*c* therefore surrounds the inlet opening 58 trapezoidally.

The latter also applies to the filter housing 56 in the present exemplary embodiment. However, it is essentially sufficient for the inlet collar 82 to produce the trapezium shape of the inlet opening 58; it is by all means possible for the filter housing 56 to be rectangular or square in cross-section here.

The side of the filter housing 56 with the deeper passage portion 80 defines the front side of the filter module 48. In the case of the described trapezium here, the deeper passage portion 80 is longer than the opposite bearing limb 82*a* of the inlet collar 82.

As mentioned above, the Connecting piece 46 of the connecting channel 42 of the air conducting device 38 is complementary to the inlet opening 58 of the filter module 48. In the present exemplary embodiment, this means that the connecting piece 46 is trapezoidal in cross-section, as clearly shown in FIGS. 5 and 6.

In the operating position of the filter module 48, the connecting piece 46 of the air conducting device 38 dips into the inlet opening 58 of the filter module 48 in such a way that the connecting piece 46 is surrounded by the inlet collar 80 of the filter module 48; this is shown, inter alia, in FIG. 4.

The connecting piece 46 moreover supports sealing means 84 which seal the connecting piece 46 of the air conducting device 38 in flow-tight manner with respect to the inlet opening 58 of the filter module 48 when this assumes its operating position. To this end, a respective sealing strip 86 is located at the three sides of the connecting piece 42 which, in the operating position of the filter module 48, are arranged adjacent to the bearing limb 82a and the two collar limbs 82b and 82c of its inlet collar 82. Each of these sealing strips 86 lies against the inlet collar 82 of the filter module 48 when it assumes its operating position, as shown in FIGS. 4 and 6.

Moreover present on the fourth side of the connecting piece 46 of the connecting channel 42 is a seal support 88 which reaches downwards over the filter module 48 when the latter is in its operating position and in turn supports a sealing strip 86 which is arranged lower than the other sealing strips 86 on the connecting piece 46. The filter module 48 thereby abuts with an abutment region 90 below its deeper passage portion 80 against the sealing strip 86 on the seal support 88 when it assumes its operating position.

As shown in FIG. 1, the filter module 48 rests on scales 92 in its operating position and is locked in its operating position by means of a locking device 94, which is also shown in FIG. 4.

In the present exemplary embodiment, the filter module 48 can be fluidically connected to, or disconnected from, the connecting piece 46 of the air conducting device 38 by being moved in the horizontal direction without having to be raised or lowered.

Each filter module 48 is designed to hold a maximum quantity of paint, i.e. for an overspray loading limit, which depends on the type of filter module 48 and the materials used for this. The quantity of paint which has already been collected can be monitored by way of the scales 92. Alternatively, the loading limit can be identified by determining the differential pressure. The greater the load on the filter module 48, the greater the air resistance which is built up through the filter module 48.

If a filter module 48 has reached its maximum holding capacity, the locking device 94 is released and the fully laden filter module 48 is removed from the separation region 44 of the paint booth 2 by means of the elevating conveyor 76. During this, the sealing strips 86 are released from the inlet collar 82 and from the abutment region 90 of the filter housing 56 and the connecting piece 46 of the connecting channel 42 of the air conducting device 38 moves through the deeper passage portion 80 of the filter housing 56.

The flow connection between the filter module 48 to be exchanged and the air conducting device 38 is broken prior to this by closing the connecting channel 42 thereof by means of a slide lock, which is not shown specifically.

Figure 2:
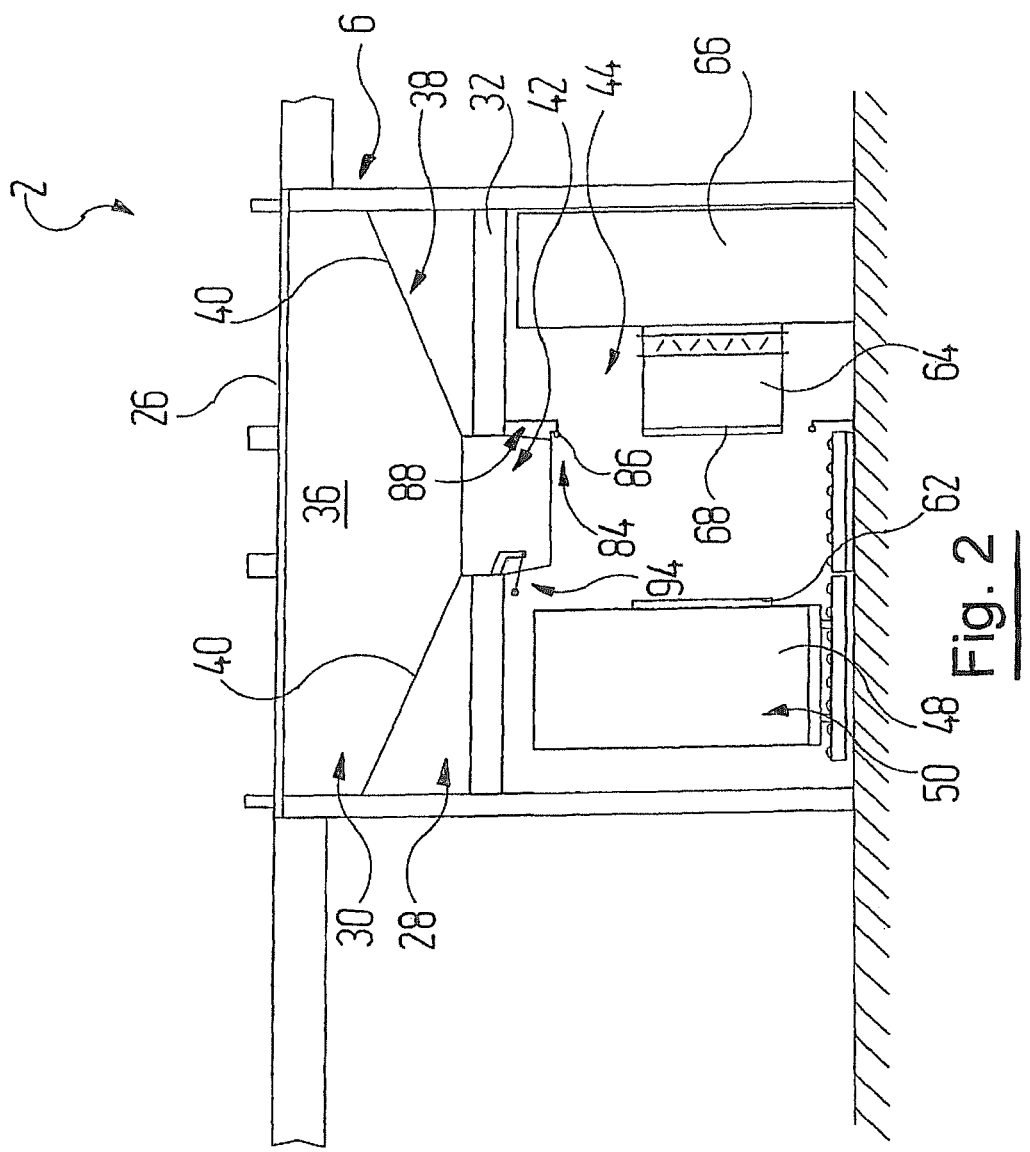
FIG. 2 a separation region of the paint booth according to FIG. 1 in a front view, with a filter module of the first type being separate from the air conducting device.

A filter module 48 which has been removed from the connecting channel 42 is shown in FIGS. 2 and 6.

An empty filter module 48 is then pushed into the operating position with its front side forward. With this, the connecting piece 46 of the connecting channel 42 passes back through the deeper passage portion 80 and moves into the inlet collar 82 of the filter module 48 until the sealing strips 86 of the connecting piece 46 abut against the associated components of the filter module 48 again and this is connected in fluid-tight manner to the connecting channel 42 of the air conducting device 38.

When the empty filter module 48 has thereby been moved into its operating position on the scales 88, it is locked accordingly by the locking device 90 and thus secured against being inadvertently moved out of the separating region 44. The slide lock of the connecting channel 42 is again brought into an open position so that the booth air flows through the newly positioned filter module 48.

In the exemplary embodiment explained above, the overspray-laden booth air enters the separation unit 50 in the form of the filter module 48 in the vertical direction. In a modification which is not shown specifically, the entry direction of the overspray-laden booth air can also deviate from this and, in an extreme case, it can be horizontal. In this case, for example, the connecting channels 42 are constructed with a 90° curve. The inlet opening 58 of the filter module 48 is then located for example on its front side and is completely surrounded by the inlet collar 80.

FIGS. 7 to 11 show a modified paint booth 2 in which a separation device 92 according to a second exemplary embodiment is present. In these, components which correspond in terms of their function to the components already explained above have the same reference numerals.

These use separation units 96 of a second type which have a smaller volume than the separation units 50 of the first type. The size ratios again show a comparison between the separation units 96 and the operator 54 also shown in FIG. 7.

In the present exemplary embodiment, the separation units 96 of the second type are constructed as a box-like filter module 98 with a filter housing in the form of a housing frame 100 which surrounds the filter unit 60. The separation units 96 are therefore also constructed as exchangeable structural units.

The inlet opening 58 here is delimited over its entirety by a continuous inlet collar 102 (clearly shown in FIG. 11) which projects over the filter unit 60.

The dimensions of the connecting channels 42 with the connection pieces 46 are correspondingly smaller in this exemplary embodiment and formed by an outlet floor 104 of the air conducting device 38, which produces a 2-dimensional matrix arrangement of the connecting channels 42.

With the aid of a conveyor system 106, the box-like filter modules 98 are moved to the connecting piece 46, coupled to this and uncoupled and moved away from this. With the aid of the conveyor system 106, it is therefore possible to convey a separation unit 96 to a connecting piece 46 of the air conducting device 38, bring it into its operating position, release it from the connecting piece 46 again and transport it away from the connecting piece 46.

To this end, the conveyor system 106 comprises a plurality of conveyor paths 108 which extend transversely to the longitudinal direction of the paint booth 2 and are arranged adjacent to one another in this longitudinal direction.

Each conveyor path 108 comprises a supply conveyor 110 and a delivery conveyor 112, between which a coupling conveyor 114 extends. The coupling conveyor 114 extends under the outlet floor 106 of the air conducting device and supports the box-like filter module 98 extensively and is pervious to the booth air. To this end, the coupling conveyor 114 can be constructed for example as a belt conveyor with a mesh-like conveyor belt.

The coupling conveyor 114 is moreover constructed as a lifting table and therefore forms a raisable and lowerable belt conveyor. It can convey the box-like filter modules 98 at the height of the supply conveyor 110 and the delivery conveyor 112 and raise them with respect to this height in the direction of the connecting piece 46 of the connecting channels 42.

During operation of the separation device 52, empty filter modules 98 are transferred in automated manner or manually to the supply conveyor 110 and transported from there to the coupling conveyor 116. During this, the individual filter modules 98 are positioned so that the connecting pieces 46 of the air conducting device 38 are aligned with the inlet openings 58 of the filter modules 98.

Figure 11:
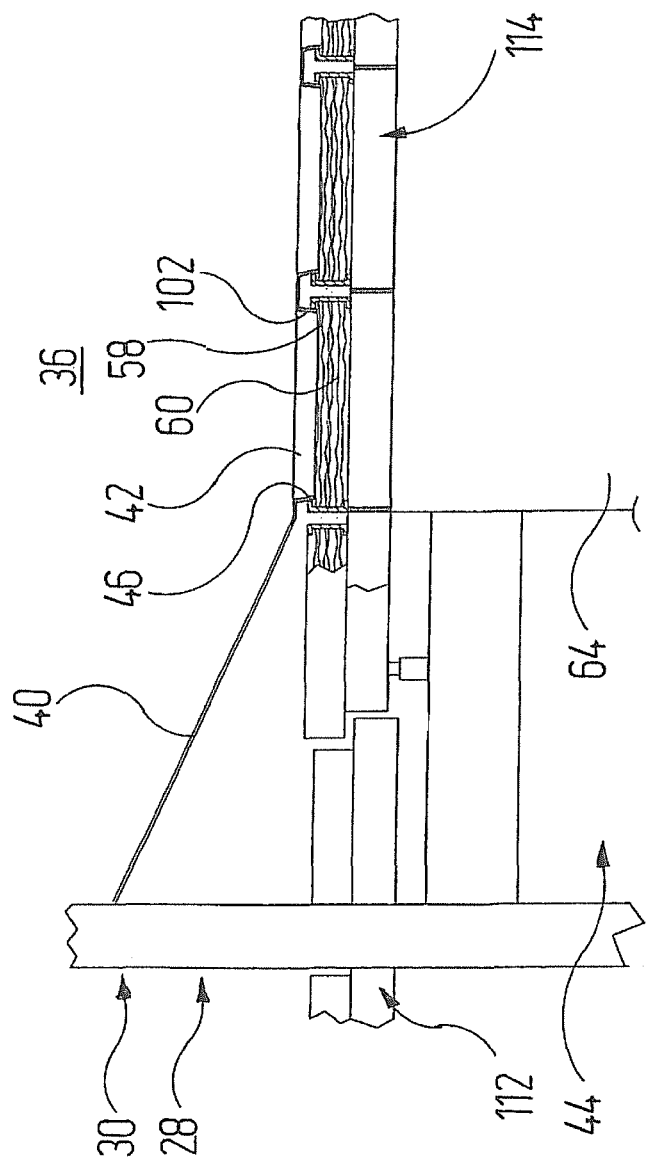
FIG. 11 a partial section on an enlarged scale, which shows the connection of filter modules of the second type to connecting pieces of the air conducting device.

The coupling conveyor 116 is then raised so that the connecting pieces 46 of the connecting channels 42 of the air conducting device 38 dip into the inlet openings 58 of the respective filter modules 98 and the filter modules 98 assume their operating position, as can be seen in FIG. 11.

The filter modules 98 are then fluidically connected to the air conducting device 38 in such a way that no overspray-laden booth air can arrive at outer surfaces of the filter modules 98. There is therefore no risk, or only a slight risk, that the filter modules 98 will stick together on the outside as a result of the depositing overspray. This applies, generally speaking, to separation units 96 which are constructed accordingly.

The overspray-laden booth air flows through the filter modules 98 in a vertical downward direction and then arrives at the intermediate channel 64, which conducts the filtered booth air here in a 90° curve to the collecting flow channel 66. The number of intermediate channels 64 in the present invention can vary depending on the structural properties; an intermediate channel 64 here can also be associated with a plurality of conveyor paths 108.

When the filter modules 98 have reached their loading limit, the coupling conveyor 116 is lowered and the now-laden filter modules 98 are transferred from the coupling conveyor 116 to the delivery conveyor 112. At the same time, the coupling conveyor 116 is equipped with empty filter modules 98 from the other side by the supply conveyor 110.

The respective delivery conveyor 112 of a conveyor path guides overspray-laden box-like filter modules 98 to a collecting container 116 so that they can be disposed of and/or recycled at a later time.

Figure 12:
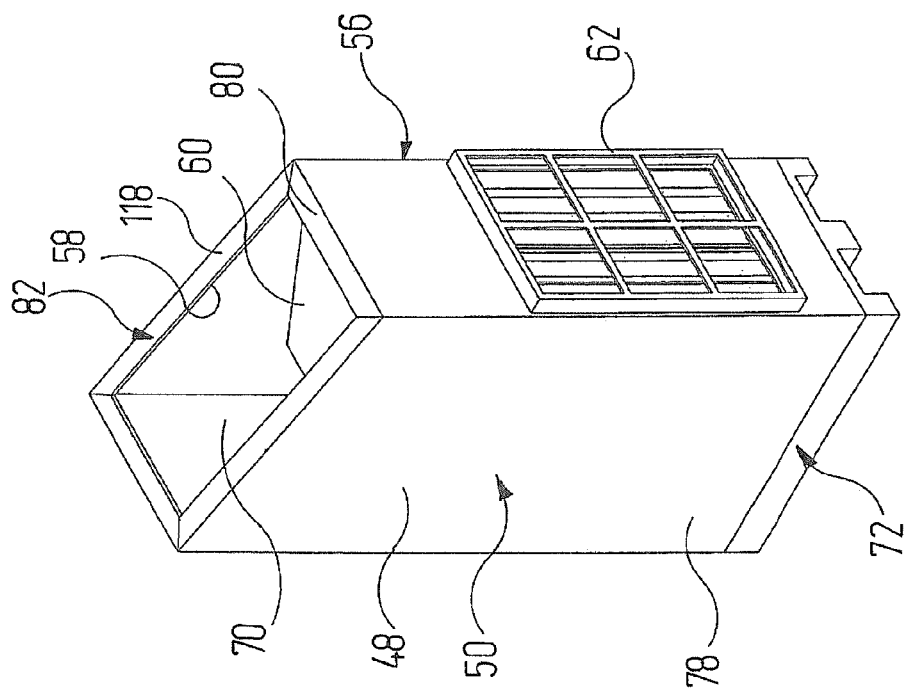
FIG. 12 a perspective view, corresponding to FIG. 3, of a modified filter module of the first type of separation device.

FIG. 12 shows a modified separation unit 50 in the form of a filter module 48, in which the inlet collar 82 is modified. Components which have already been explained have the same reference numerals in this.

This comprises a circumferential bearing frame 118 which surrounds the filter inlet opening 58 and is inclined with respect to a horizontal plane in the operating position of the filter module 48. In this arrangement, the bearing frame 118 extends obliquely upwards from the front side of the filter module 48 to its rear side. As a result of the inclination of the bearing frame 118, the deeper portion 80 of the inlet collar 82 is formed accordingly at its lowest point.

Figure 13:
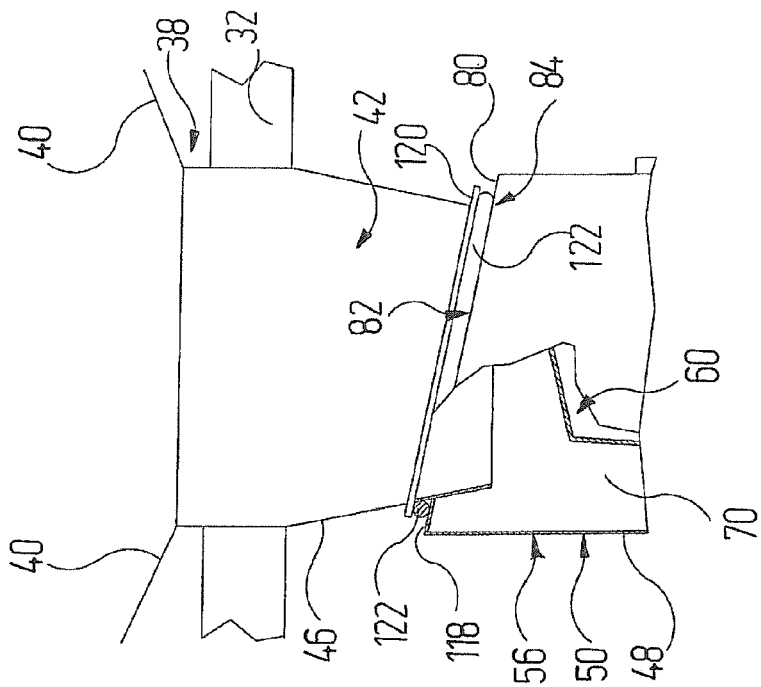
FIG. 13 a partial view on an enlarged scale, which shows the connection of the filter module of the first type according to FIG. 12 to a connecting piece, adapted thereto, of the air conducting device.

As shown in FIG. 13, the connecting piece 46 of the air conducting device 42 is adapted to the thus-modified inlet collar 82 of the filter module 48. To this end, the connecting piece 46 comprises a circumferentially projecting sealing collar 120 which supports circumferential sealing strips 122 at its lower side as sealing means 84. The sealing collar 120 is inclined in a complementary manner to the bearing frame 118 of the filter module 48 so that the filter module 48 can also be fluidically connected to, or disconnected from, the connecting piece 46 of the air conducting device 38 by being moved in a horizontal direction without having to be raised or lowered.

An empty filter module 48 with the bearing collar 118 is pushed into the operating position with its front side forward. In this arrangement, the connecting piece 46 of the connecting channel 42 enters the filter inlet opening 58 at the lowest point of the bearing frame 118 until the sealing strips 122 on the sealing collar 120 of the connecting piece 46 abut against the bearing frame 118 of the filter module 48 so that this is connected in flow-tight manner to the connecting channel 42 of the air conducting device 38, as shown in FIG. 13.

When removing a laden filter module 48 with the bearing frame 118, this latter is moved away accordingly from the sealing collar 120 of the connecting piece 46 of the air conducting device 42 as the filter module 48 is moved.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for separating overspray from the overspray-laden booth air of coating systems comprising:
   a) a separation unit through which overspray-laden booth air can be conducted and in which overspray is separated;
   wherein
   b) the separation unit is constructed as an exchangeable structural unit with a filter housing, an inlet opening and a filter unit;
   c) the overspray-laden air flow can be conducted via an air conducting device to the separation unit,
   wherein
   d) the separation unit has an inlet collar which delimits the inlet opening at least in part; and
   e) the air conducting device comprises a connecting piece which, in an operating position of the separation unit, dips into the inlet opening thereof in such a way that the connecting piece is surrounded by the inlet collar of the separation unit,
   wherein the inlet opening is arranged at the top in the operating position of the separation unit, and
   wherein sealing means are present, by means of which the connecting piece of the air conducting device can be sealed in flow-tight manner with respect to the inlet opening of the filter module.

2. The device according to claim 1, wherein the inlet collar has a deeper portion so that a collar portion of the inlet collar is formed which projects with respect to the deeper portion.

3. The device according to claim 1, wherein the collar portion comprises three limbs and surrounds the inlet opening trapezoidally, with the outlet connection of the air conducting device being complementary thereto.

4. The device according to claim 2, wherein the inlet collar is constructed as a bearing frame which, in the operating position of the separation unit, is inclined with respect to a horizontal plane, as a result of which the deeper portion is formed at the lowest point of the bearing frame, with the outlet connection of the air conducting device being complementary thereto.

5. The device according to claim 1, wherein the filter housing of the separation unit, is constructed as a housing frame which surrounds the filter unit.

6. The device according to claim 5, wherein the air conducting device comprises a plurality of connecting pieces for a plurality of separation units which are formed by an outlet floor of the air conducting device.

7. The device according to claim 6, wherein the plurality of connecting pieces are arranged in a 2-dimensional matrix.

8. The device according to claim 1, wherein a conveyor system is present, by means of which a separation unit can be conveyed to a connecting piece of the air conducting device, brought into its operating position, disconnected from the connecting piece again and transported away from the connecting piece.

9. The device according to claim 8, wherein the conveyor system comprises at least one belt conveyor, in particular a raisable or lowerable belt conveyor.

10. The device according to claim 1, wherein the sealing means are supported on a least three surfaces of the connecting piece, wherein the sealing means dip inside the inlet opening of the separation unit and physically engage the interior of the inlet collar when the separation unit is in the operating position.

11. The device according to claim 10, further comprising a seal support supporting a sealing strip, the seal support extending downwards from a fourth surface of the connecting piece, the sealing strip supported by the seal support being positioned lower than the sealing means, the sealing strip engaging an abutment region of the separation unit when the separation unit is in the operating position.

12. The device according to claim 11 wherein the sealing strip and arm extend along an outer edge of the abutment region of the separation unit when the separation unit is in the operating position.

13. The device according to claim 1 wherein the connecting piece includes a locking device which moves between a locked position and a release position, wherein when the separation unit is in the operating position, the locking device is moved to the locking position causing the locking device to engage an outer surface of the filter housing.

14. A device for separating overspray from the overspray-laden booth air of coating systems comprising:
   a) a separation unit through which overspray-laden booth air can be conducted and in which overspray is separated;
   wherein
   b) the separation unit is constructed as an exchangeable structural unit with a filter housing, an inlet opening and a filter unit;
   c) the overspray-laden air flow can be conducted via an air conducting device to the separation unit,
   wherein
   d) the separation unit has an inlet collar which delimits the inlet opening at least in part; and
   e) the air conducting device comprises a connecting piece which, in an operating position of the separation unit, dips into the inlet opening thereof in such a way that the connecting piece is surrounded by the inlet collar of the separation unit,
      wherein the connecting piece includes a locking device which moves between a locked position and a release position, wherein when the separation unit is in the operating position, the locking device is moved to the locking position causing the locking device to engage an outer surface of the filter housing.

15. The device according to claim 14, wherein the inlet opening arranged at the top in the operating position of the separation unit.

16. The device according to claim 15, wherein the inlet collar has a deeper portion so that a collar portion of the inlet collar is formed which projects with respect to the deeper portion.

17. The device according to claim 15, wherein the collar portion comprises three limbs and surrounds the inlet opening trapezoidally, with the outlet connection of the air conducting device being complementary thereto.

18. The device according to claim 16, wherein the inlet collar is constructed as a bearing frame which, in the operating position of the separation unit, is inclined with respect to a horizontal plane, as a result of which the deeper portion is formed at the lowest point of the bearing frame, with the outlet connection of the air conducting device being complementary thereto.

19. The device according to claim 14, wherein the filter housing of the separation unit, is constructed as a housing frame which surrounds the filter unit.

20. The device according to claim 19, wherein the air conducting device comprises a plurality of connecting pieces for a plurality of separation units which are formed by an outlet floor of the air conducting device.

21. The device according to claim 20, wherein the plurality of connecting pieces are arranged in a 2-dimensional matrix.

22. The device according to claim 14, wherein a conveyor system is present, by means of which a separation unit can be conveyed to a connecting piece of the air conducting device, brought into its operating position, disconnected from the connecting piece again and transported away from the connecting piece.

23. The device according to claim 22, wherein the conveyor system comprises at least one belt conveyor, in particular a raisable or lowerable belt conveyor.

24. The device according to claim 15, wherein sealing means are present, by means of which the connecting piece of the air conducting device can be sealed in flow-tight manner with respect to the inlet opening of the filter module and the sealing means are supported on a least three surfaces of the connecting piece, wherein the sealing means dip inside the inlet opening of the separation unit and physically engage the interior of the inlet collar when the separation unit is in the operating position.

25. The device according to claim 24, further comprising a seal support supporting a sealing strip, the seal support extending downwards from a fourth surface of the connecting piece, the sealing strip supported by the seal support being positioned lower than the sealing means, the sealing strip engaging an abutment region of the separation unit when the separation unit is in the operating position.

26. The device according to claim 25 wherein the sealing strip and arm extend along an outer edge of the abutment region of the separation unit when the separation unit is in the operating position.

* * * * *